(12) United States Patent
Cox et al.

(10) Patent No.: US 6,514,325 B2
(45) Date of Patent: Feb. 4, 2003

(54) MELT BLOWN COMPOSITE HEPA VACUUM FILTER

(75) Inventors: Stephen T. Cox, Radford, VA (US); David T. Healey, Christianburg, VA (US)

(73) Assignee: Hollingsworth & Vose Company, East Walpole, MA (US)

(*) Notice: Subject to any disclaimer, the term of this patent is extended or adjusted under 35 U.S.C. 154(b) by 24 days.

(21) Appl. No.: 09/804,463

(22) Filed: Mar. 12, 2001

(65) Prior Publication Data

US 2001/0045086 A1 Nov. 29, 2001

Related U.S. Application Data

(60) Provisional application No. 60/189,652, filed on Mar. 15, 2000.

(51) Int. Cl.[7] .............................. B03C 3/28; B01D 39/00
(52) U.S. Cl. .............................. 96/69; 55/382; 55/486; 55/524; 55/527; 55/528; 55/DIG. 2; 55/DIG. 39; 15/347
(58) Field of Search .................... 55/382, 482, 485, 55/486, 522, 524, 527, 528, DIG. 2, DIG. 39; 96/15, 17, 55, 58, 66, 68, 69; 15/347

(56) References Cited

U.S. PATENT DOCUMENTS

| | | | | |
|---|---|---|---|---|
| 4,215,682 A | | 8/1980 | Kubik et al. ............ 128/205.29 |
| 4,650,506 A | * | 3/1987 | Barris et al. .................. 55/487 |
| 5,306,534 A | * | 4/1994 | Bosses ......................... 55/382 |
| 5,401,446 A | | 3/1995 | Tsai et al. ..................... 264/22 |
| 5,411,576 A | | 5/1995 | Jones et al. .................... 95/57 |
| 5,645,627 A | * | 7/1997 | Lifshutz et al. ............... 55/524 |
| 6,110,251 A | | 8/2000 | Jackson et al. ............... 55/527 |
| 6,156,086 A | * | 12/2000 | Zhang ......................... 55/382 |
| 6,171,369 B1 | * | 1/2001 | Schultink et al. ............ 55/382 |
| 6,238,466 B1 | * | 5/2001 | Rousseau et al. ............ 55/524 |
| 2001/0042361 A1 | * | 11/2001 | Cox et al. .................... 55/382 |

* cited by examiner

Primary Examiner—Duane Smith
Assistant Examiner—Jason M. Greene
(74) Attorney, Agent, or Firm—Nutter, McClennen & Fish LLP

(57) ABSTRACT

An electret filter media includes an additive or mixtures thereof that enhance the charge stability of the media. The filter media achieves acceptable alpha values for a range of filtration challenges without significant decay in alpha values over time. Preferred charge additives include fatty acid amides and mixtures thereof.

16 Claims, 1 Drawing Sheet

MELT BLOWN COMPOSITE HEPA VACUUM FILTER

CROSS-REFERENCE TO RELATED APPLICATIONS

This application claims priority from U.S. Provisional Patent Application Serial No. 60/189,652, filed on Mar. 15, 2000, entitled "Melt Blown Composite HEPA Vacuum Bag," which is expressly incorporated by reference herein.

BACKGROUND OF THE INVENTION

Paper filter media have generally been used as disposable vacuum cleaner bags. The paper filters are comparatively inexpensive but suffer from being ineffective in the removal of extremely fine dust and dirt particles. More problematic with such filter bags is that they tend to become plugged with the trapped dirt.

The porosity of the paper filter media allows passage of fine dust through the bag wall thus permitting the filter to be at least partially filled with particulates before the air pressure drop across the bag wall increases to an unacceptable level. Reduction of the porosity of the media can improve filtration performance of the media but the effect is to increase the air pressure drop across the media. Additionally, reduced porosity of the filter media enables dirt particles to accumulate on the media surface at a faster rate than for a more porous filter, thereby causing a more rapid rate of increase in the pressure drop across the media. This phenomenon shortens the service life of the filter.

The recognition of the adverse effects of inhaled particles, especially particles in the sub-10 micron range, has led to the development of filter materials to remove these minute particles from air streams. These filters are commonly designated as HEPA (High Efficiency Particulate Air) and ULPA (Ultra Efficiency Particulate Air) filters.

The use of nonwoven microfibrous mats as the filter media for vacuum cleaner filters is known as an alternative to paper filter media. In general, microfibrous mats have higher particle capture efficiencies with comparable or lower pressure drops than paper media. However, microfibrous mats having the required air permeability are typically thicker than paper filters and tend to be significantly weaker than paper media. To circumvent this problem, a carrier fabric has been used to help facilitate handling the nonwoven. As a result, the composite layers have been thicker than standard paper filter media and do not have the handling characteristics of paper media so that they could be converted into vacuum cleaner filter bags with the same equipment used with the paper media.

Conventional filter media are substantially lacking in electrostatic charge and rely upon impingement, impaction and diffusion for filter performance. Electret filter materials offer improved filtering performance over conventional filter materials. The presence of oriented dipoles in the electret filter media is believed to enhance filter performance by allowing the filter media to attract and retain charged and uncharged particles to be filtered.

Electret filter materials are made by a variety of known techniques. One technique for manufacturing electret filter media involves extruding a polymer, typically having a high melt flow index, through a die having a linear array of orifices. An air knife is used to attenuate the extruded polymer fibers by a ratio of about 300:1. The attenuated fibers, having diameters of about one to ten micrometers, are collected on a rotating drum or moving belt using a moderate vacuum. The fiber web is then treated to impart on the fiber web charge pairs or dipoles. The charge pairs or dipoles can be imparted to the fiber, for example, using AC and/or DC corona discharge.

There is thus a need for vacuum filter bags which exhibit the advantageous properties of electret filter media while having improved charge stability and are able to maintain acceptable filter performance over time.

SUMMARY OF THE INVENTION

The present invention circumvents the problems described above by providing a multicomponent composite filter media that includes a support layer, at least one layer of a melt blown electret polymer fiber web having a melt processable fatty acid amide present within the web and, optionally, a second support layer. In a preferred embodiment, the composite includes one, two, three or more melt blown electret polymer fiber webs, preferably at least four layers of melt blown electret polymer fibers webs, having the melt processable fatty acid amide present within the web. Generally, all layers are composed of a similar resin, e.g., all layers are prepared from polypropylene. In a preferred embodiment, each layer is laminated to the other layers by ultrasonic welding, ultrasonic bonding patterns which can be edge welded, full width, partial width or combinations thereof, adhesives, thermal bonding, calendering (pressure), or by other methods known to those having ordinary skill in the art.

The invention also provides composite filter media which have enhanced filtration performance characteristics. In particular, the present invention provides charge stabilized electret filter media that is useful for vacuum bags. The bags are both reusable and disposable.

The invention provides composite filter media which includes a melt blown electret polymer fiber web having a melt processable fatty acid amide present within the web. Typically, the melt processable fatty acid amide is present at a concentration of about 0.5% to about 11% by weight, generally between about 1% to 8% by weight, preferably about 1% by weight. Suitable melt processable fatty acid amides, e.g., nonionic fatty acid amides, include stearamides or ethylene bis-stearamides. An exemplary commercially available fatty acid amide is ACRAWAX®C. In one embodiment the filter media is annealed.

The electret melt blown polymer fiber web layer(s) can be made from a variety of polymeric materials, including polypropylene, polyester, polyamide, polyvinyl chloride, polymethylmethacrylate, and polyethylene. Polypropylene is among the more preferred polymeric materials. Typically, the polymer fibers that form the web have a diameter in the range of about 1 to 15 micrometers, preferably about 3 micrometers, and the weight of the melt blown polymer fiber web is in the range of about 10 to about 100 $g/m^2$, preferably about 35 $gm^2$.

The composite electret filter media of this invention is characterized by improved filtration performance and enhanced charge stability of the electret polymer web layer(s). In particular, the filter media is able to provide desirable filtration properties, as indicated by alpha value, despite continued filtration challenge.

In another aspect the invention relates to a method of manufacturing a composite filter media by melt blowing onto a collecting belt, a first polymer resin having a charge stabilizing fatty acid amide incorporated therein. This produces a first web of melt blown polymer fibers in which the charge stabilizing amide is present at a concentration from about 0.5% to about 11% by weight. The first melt blown web is treated to form substantially permanent charge pairs or dipoles in the first melt blown polymer web, yielding an electret material.

A second melt blown web of polymer fibers having a charge stabilizing fatty acid amide incorporated therein is melt blown onto the first melt blown electret layer. Again, the charge stabilizing amide is present in the polymer resin at a concentration from about 0.5% to about 11% by weight. The second melt blown web is then treated to form substantially permanent charge pairs or dipoles in the second melt blown polymer web, yielding an electret material.

Collectively, the first and second melt blown webs can be termed the composite first component.

A third melt blown web of polymer fibers having a charge stabilizing fatty acid amide incorporated therein is collected on a collecting belt having. This produces a third web of melt blown polymer fibers in which the charge stabilizing amide is present at a concentration from about 0.5% to about 11% by weight. The third melt blown web is treated to form substantially permanent charge pairs or dipoles in the first melt blown polymer web, yielding an electret material.

Optionally, a fourth melt blown web of polymer fibers having a charge stabilizing fatty acid amide incorporated therein is melt blown onto the third melt blown electret layer. Again, the charge stabilizing amide is present in the polymer resin at a concentration from about 0.5% to about 11% by weight. The fourth melt blown web is then treated to form substantially permanent charge pairs or dipoles in the second melt blown polymer web, yielding an electret material.

The third melt blown layer and, optionally, any fourth or subsequent melt blown layers can collectively be termed the composite second component.

The first composite component and the second composite component are then contacted, e.g., laminated, to each other to form the final composite. This can be done by placing one of the melt blown webs of the first composite adjacent one of the melt blown webs of the second composite component and then laminating the two composite components. Optionally, an outermost support layer(s) can be contacted to one of the outermost melt blown layers to provide additional strength to the composite.

The present invention provides the advantage that the melt blown layers are not entangled within or to a substrate layer, e.g., a spunbond material or a support layer, upon which they are formed. Consequently, the melt blown fibers are not coextensively deposited directly on nor do they adhere to a support layer, such as a nonwoven fabric or a spunbond material. This unique process of successive layering of melt blown fiber webs onto each other provides the advantage of control of each layer's weight basis, and hence, the ability to control the air permeability of each layer and to provide a unique composite. Additionally, the entanglement of fibers between each adjacent melt blown layer provides strength to the overall composite. The enmeshed composite produced by the method of the invention provides a product that is more dense than those presently available. Further, the resulting composite is still chargeable and allows for greater flexibility in ultrasonic bonding, without any burn through.

The permanent dipoles can be imparted to the web by a variety of techniques including AC corona or DC corona discharge and combinations thereof. In an embodiment the manufacturing process can be modified by heat treating the polymer web, which has incorporated therein a melt processable fatty acid amide additive, after charging the material by AC and/or DC corona discharge.

The filter composites of the present invention can be used in a variety of filtration applications in which a relatively stable alpha value is desired. Among the uses for such filter media are industrial face masks, ASHRAE filters, HEPA filters, e.g., HEPA vacuum filter bags, and ULPA filters.

Other advantages of the invention will be readily apparent to one having ordinary skill in the art upon reading the following description.

All percentages by weight identified herein are based on the total weight of each layer of the web unless otherwise indicated.

DETAILED DESCRIPTION OF THE INVENTION

The features and other details of the invention are described below. It will be understood that the particular embodiments of the invention are shown by way of illustration and not as limitations of the invention. The principle features of this invention can be employed in various embodiments without departing from the scope of the invention.

The present invention is based, at least in part, on a discovery that the present invention provides multicomponent electret filter media composites that have improved charge stability. The charge stability is manifested by acceptable alpha levels, with minimal alpha decay, when the filter media are subjected to solid and/or liquid aerosol challenges. In instances where alpha decay occurs, the final alpha value is still indicative of acceptable filter performance. The filter media of the invention include an electret polymer fiber web having incorporated therein at least one charge stabilizing additive, e.g., a fatty acid amide, or mixtures of two or more fatty acid amides. The filter media composites are useful in the manufacture of HEPA vacuum filter bags.

The present invention provides a multicomponent composite filter media that includes, optionally, a support layer, at least one layer of a melt blown electret polymer fiber web having incorporated within the web a melt processable fatty acid amide at a concentration in a range of about 0.5% to 11% by weight and, optionally, a second support layer. In a preferred embodiment, the composite includes one, two, three or more melt blown electret polymer fiber webs, and preferably at least four layers, of melt blown electret polymer fibers webs, each layer having incorporated within the web a melt processable fatty acid amide. The first and second layers, and subsequent pairs of layers, are melt blown onto each other, thereby entangling and enmeshing a later melt blown layer with a first melt blown layer which serves as a substrate. Generally, all layers are composed of a similar resin, e.g., polypropylene. In one embodiment, each layer is laminated to the other layers by the use of ultrasonic welding, ultrasonic bonding, adhesives, thermal bonding, calendering (pressure), or by other methods known to those having ordinary skill in the art. Ultrasonic bonding can be accomplished by edge welding, full width bonding, partial width bonding or combinations thereof.

Figure 1:
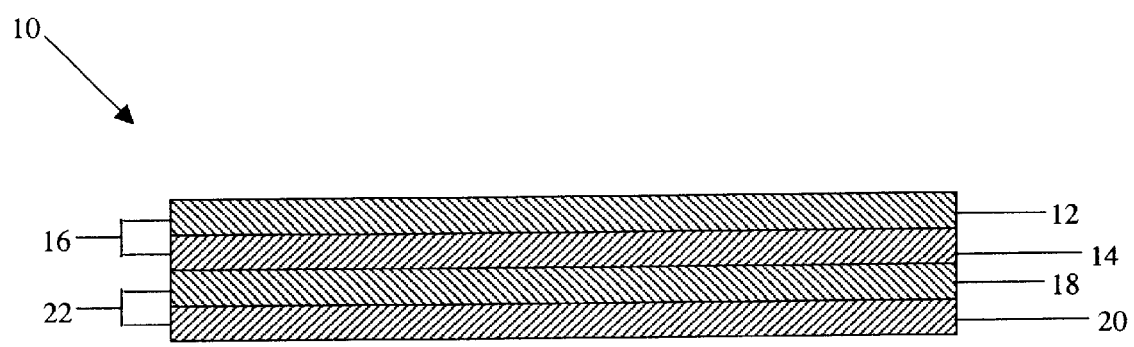
FIG. 1 is a sectional view of a multicomponent electret filter media according to the present invention.

As shown in FIG. 1, the present invention provides a multicomponent composite filter media 10 that includes a first melt blown layer 12 upon which is formed a second melt blown layer 14. The first and second melt blown layers 12, 14 are collectively termed the composite first component 16. A third melt blown layer 18 is also present, and, optionally, a fourth melt blown layer 20 is formed upon layer 18. The third and fourth melt blown layers 18, 20 are collectively termed the composite second component 22. The composite first component 16 and the composite second component 22 are joined together, as shown in FIG. 1, such that the second and third melt blown layers 14, 18 are in contact with each other.

The filter media 10 may be used in a variety of filtration applications. In one aspect, the filter media 10 is used within or to form a vacuum bag. One of ordinary skill in the art will readily appreciate the variety of suitable techniques that can be used to form a vacuum bag lined with the filter media of the present invention.

Figure 2:
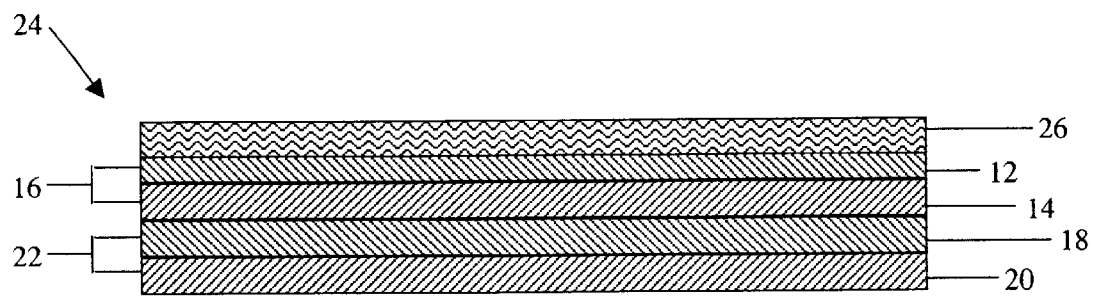
FIG. 2 is a sectional view of a portion of a vacuum cleaner bag constructed using the multicomponent electret filter media according to the present invention.

FIG. 2 illustrates a partial cross sectional view of a vacuum bag 24 constructed using the filter media 10 of the present invention. The vacuum bag 24 includes at least one outermost supporting layer 26 that forms the external portion of the bag 24. Supporting layer 26 may be contacted to, e.g., laminated to, first melt blown layer 12. Vacuum bag 24 further includes melt blown layers 14, 18, and 20.

Support layers are well known to those of ordinary skill in the art. For example, the support layer(s) can be prepared from various polymer resins, including but not limited to, polyolefins such as polyethylene, preferably, polypropylene, polyisobutylene, and ethylene-alpha-olefin copolymers; acrylic polymers and copolymers such as polyacrylate, polymethylmethacrylate, polyethylacrylate; vinyl halide polymers and copolymers such as polyvinyl chloride; polyvinyl ethers such as polyvinyl methyl ether; polyvinylidene halides, such as polyvinylidene fluoride and polyvinylidene chloride; polyacrylonitrile; polyvinyl ketones; polyvinyl amines; polyvinyl aromatics such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; natural and synthetic rubbers, including butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers, and polyurethane rubbers; polyamides such as Nylon 66 and polycaprolactam; polyesters, such as polyethylene terephthalate; polycarbonates; polyimides; polyethers; fluoropolymers such as polytetrafluoroethylene and fluorinated ethylenepropylene.

The support layer provides strength and support, e.g., stiffness, to the composite as well as helping to remove large pieces of dirt, particulates, debris to be removed from the air stream. The support layer is also foldable. In general, the support layer has a weight basis of about 0.9 ounces/yd$^2$ to about 4.0 ounces/yd$^2$, more preferably about 1.2 ounces/yd$^2$ to about 2.0 ounces/yd$^2$, and most preferably about 1.6 ounces/yd$^2$. In one embodiment, the support layer is TYPAR® 3151, a polypropylene support manufactured by DuPont having a basis weight of 1.6 ounces/yd$^2$ and an average fiber diameter of about 22 micrometers.

Examples of charge stabilizing additives that are incorporated into the melt blown layers include fatty acid amides derived from fatty acids. The term "fatty acid" is recognized by those having ordinary skill in the art and it is intended to include those saturated or unsaturated, straight chain or branched chain carboxylic acids obtained from the hydrolysis of fats. Examples of suitable fatty acids include lauric acid (dodecanoic acid), myristic acid (tetradecanoic acid), palmitic acid (hexadecanoic acid), stearic acid (octadecanoic acid), oleic acid ((Z)-9-octadecenoic acid), linoleic acid ((Z,Z)-9,12-octadecadienoic acid), linolenic acid ((Z,Z,Z)-9,12,15-octadecatrienoic acid), and eleostearic acid (Z,E,E)-9,11,13-octadecatrienoic acid). Typically the amides formed from the above referenced acids are primary amides which are prepared by methods well known in the art.

Suitable charge stabilizing agents include secondary and tertiary fatty acid amides wherein the amide nitrogen is substituted with one or more alkyl groups. Secondary and tertiary fatty acid amides can also be prepared by methods well known in the art, such as by esterification of a fatty acid followed by an amidation reaction with a suitable alkylamine. The alkyl substituents on the amide nitrogen can be straight chain or branched chain alkyl groups and can have from about two to about twenty carbon atoms, inclusive, preferably from about two to about fourteen carbon atoms, inclusive, more preferably from about two to about six carbon atoms, inclusive, most preferably about two carbon atoms. In a preferred embodiment, the fatty acid amide can be a "bis" amide in which an alkyl chain tethers two nitrogens of two independent amide molecules. For example, alkylene bis-fatty acid amides include alkylene bis-stearamides, alkylene bis-palmitamides, alkylene bis-myristamides and alkylene bis-lauramides. The alkyl chain tether typically includes about two to eight carbon atoms, inclusive, preferably two carbon atoms. The alkyl chain tether can be branched or unbranched. Exemplary bis fatty acid amides include ethylene bis-stearamides and ethylene bis-palmitamides such as N,N'-ethylenebisstearamide and N,N'-ethylenebispalmitamide.

In certain embodiments, the charge stabilizing additive, e.g., a fatty acid amide, can be present within the polymer fiber web at a concentration in the range of about 0.5% to about 11% by weight. In other embodiments, the charge stabilizing additive can be present within the polymer fiber web at a concentration in the range of about 0.5% to about 8% by weight. A preferred concentration range for the fatty acid amide charge stabilizing additive is about 1% by weight of the web. The ranges of concentrations intermediate to those listed are also intended to be part of this invention, e.g., about 2.5% to about 9%, 4.0% to about 6%, and about 1% to about 1.5% by weight. For example, ranges of concentration using a combination of any of the above values recited as upper and/or lower limits are intended to be included, e.g., 1% to about 6%, 2.5% to about 11%, etc.

One group of useful charge stabilizing additives, as noted above, are fatty acid amides. Examples of preferred fatty acid amides include stearamide and ethylene bis-stearamide. An exemplary stearamide is commercially available as UNIWAX 1750, available from UniChema Chemicals, Inc. of Chicago, Ill. ACRAWAX® C is an ethylene bis-stearamide which is commercially available from Lonza, Inc. of Fair Lawn, N.J. ACRAWAX® C contains N,N'-ethylenebisstearamide (CAS No.110-30-5) and N,N'-ethylenebispalmitamide (CAS No. 5518-18-3) with a mixture of C-14 to C-18 fatty acid derivatives (CAS No. 67701-02-4) with an approximate ratio of 65/35/2 (N,N'-ethylenebisstearamide/N,N'-ethylenebispalmitamide/mixture of C-14 to C-18 fatty acid derivatives) by weight. For example, the commercial product includes N,N'-ethylenebisstearamide, N,N'-ethylenebispalmitamide with C14–C18 fatty acids. In certain embodiments of the invention, either N,N'-ethylenebisstearamide or N,N'-ethylenebispalmitamide can be the sole charge stabilizing additive. In another embodiment, the ratio of a C14–C18 fatty acid can vary from between about 0 to 20% based on the total amount of the bisamides. In still other embodiments, mixtures of N,N'-ethylenebisstearamide and N,N'-ethylenebispalmitamide which fall in the range between about 0 to 100% for each bisamide can be utilized as additive mixtures, e.g., 80/20, 70/30, 5/50, etc.

The polymers used to form the fibers of the melt blown web(s) can be selected from among many suitable polymers, such as those listed above for the support layer resins. Examples of these polymers include polyethylene, polyester, polyamide, polyvinyl chloride, polymethyl methylacrylate and, preferably, polypropylene.

One of ordinary skill in the art will appreciate that melt blown webs are comprised of fibers having a relatively broad fiber diameter distribution. The average fiber diameter of the polymer used to form the polymer fiber web generally is in the range of about 1 to about 15 micrometers, inclusive. Depending on the intended application, a more preferred average polymer fiber diameter is in the range of about 2 to about 5 micrometers, inclusive, more preferably about 3 micrometers.

The web basis weight of the polymer fiber web will vary depending upon the requirements of a given filtering application. In general, higher web basis weights yield better filtration, but there exists a higher resistance, or pressure drop, across the filter barrier when the filter media has a higher basis weight. For most applications the web basis weight can be in the range of between about 10 to about 100 g/m², inclusive. Preferably the web basis weight is in the range of between about 30 to about 60 g/m², inclusive, more preferably between about 30 to about 50 g/m², inclusive, preferably about 35 g/m². One of ordinary skill in the art can readily determine the optimal web basis weight, considering such factors as the desired filter efficiency and permissible levels of resistance. Furthermore, the number of plies of the melt blown polymer fiber web used in any given filter application can also vary from approximately 1 to 10 plies. One of ordinary skill in the art can readily determine the optimal number of plies to be used.

The basis weight of the composite will also vary depending upon the requirements of a given filtering application. In general, higher composite basis weights yield better filtration, but there exists higher resistance, or pressure drop, across the filter barrier when the composite has a higher basis weight. For most applications the composite basis weight can be in the range of about 110 to about 440 g/m², inclusive. Preferably the composite weight basis is in the range of about 160 to about 400 g/m², inclusive, and more preferably about 175 to about 230 g/m². One of ordinary skill in the art can readily determine the optimal web basis weight, considering such factors as the desired filter efficiency and permissible levels of resistance. Furthermore, the number of plies of the melt blown polymer fiber web used in any given filter application can also vary from approximately 1 to 10 plies. One of ordinary skill in the art can readily determine the optimal number of plies to be used.

The overall thickness of the composite varies depending upon the number of layers within the composite. Generally, the composite will include a support layer and at least four layers, e.g., two pairs, of enmeshed melt blown fiber webs. The overall thickness of the composite is in the range of about 40 to about 150 mm, preferably about 55 and 90 mm, most preferably about 65 to about 75 mm.

As noted above, the melt processable fatty acid amide is intimately dispersed throughout the fiber web fibers that make up the polymeric fiber web. Preferably, the melt processable fatty acid amide is thoroughly mixed with the polymer resin to form polymer pellets that are able to be extruded into fibers having the amide incorporated therein. Those having ordinary skill in the art will appreciate that the fatty acid amide can be incorporated into a polymer resin in a number of ways. In one example, the fatty acid amide can be combined with polymer resin using a two screw extruder, yielding pellets with a concentrated amount of the fatty acid amide. These concentrated pellets can then be combined with fatty acid amide-free polymer pellets having no amide additive in an extrusion process that yields the desired polymer fiber web.

Filter performance is evaluated by different criteria. It is desirable that filters, or filter media, be characterized by low penetration across the filter of contaminants to be filtered. At the same time, however, there should exist a relatively low pressure drop, or resistance, across the filter. Penetration, often expressed as a percentage, is defined as follows:

$$Pen = C/C_0$$

where C is the particle concentration after passage through the filter and $C_0$ is the particle concentration before passage through the filter. Filter efficiency is defined as $$100 - \% \text{ Penetration}.$$

Because it is desirable for effective filters to maintain values as low as possible for both penetration and pressure drop across the filter, filters are rated according to a value termed alpha ($\alpha$), which is the slope of log penetration versus pressure drop across the filter. Steeper slopes, or higher alpha values, are indicative of better filter performance. Alpha is expressed according to the following formula $$\alpha = -100 \log (C/C_0)/D P,$$

where D P is the pressure drop across the filter.

In many filtering situations it is important to have a high initial alpha value. However, it is equally, if not more important, to maintain acceptable alpha values well into the filtration process. The problem of decaying alpha values is, as noted above, a problem often encountered in certain filtration procedures. In many instances it is thus important to achieve acceptable alpha values well into the filtering process. Some standard tests for evaluating filter performance focus on penetration and resistance (as related by alpha value) after 200 milligrams of loading. Alpha decay is generally not a problem in filtering gases that contain only solids. In fact, in such filtering applications the alpha value often increases over time. The phenomenon of alpha decay is more evident while filtering gases that contain liquid droplets or a mixture of liquid droplets and solid particles.

An exemplary DOP challenge employs an automated filter testing unit purchased from TSI, Inc. equipped with an oil generator. The instrument measures pressure drop across filter media and the resultant penetration value on an instantaneous or "loading" basis at a flow rate less than or equal to 115 liters per minute (lpm). Instantaneous readings are defined as 1 pressure drop/penetration measurement. In preferred embodiments, the DOP resistance is in the range of about 15 to 45 mm $H_2O$ at 52 lpm, and preferably it is about 20 to about 35 mm $H_2O$ at 52 lpm. Additionally, DOP penetration is in the range of about 0.001% to about 0.03%, preferably about 0.001% to about 0.01%, and most preferably it is at least about 0.005%(0.26 microns droplet size of DOP).

An exemplary NaCl test procedure employs a CertiTest™ automated filter testing unit from TSI, Inc. equipped with a sodium chloride generator. The average particle size created by the unit is 0.3 to 0.5 micrometers. The instrument measures a pressure drop across the filter media and the resultant penetration value on an instantaneous basis at a flow rate less than or equal to 115 liters per minute (lpm). Instantaneous readings are defined as 1 pressure drop/penetration measurement. In preferred embodiments, the NaCl resistance is in the range of about 15 to about 45 mm $H_2O$ at 52 lpm, and preferably it is about 20 to about 35 mm $H_2O$ at 52 1pm. Additionally, NaCl penetration is in the range of about 0.001% to about 0.03%, preferably about 0.001% to about 0.01%, and most preferably it is at least about 0.005% (0.3 to about 0.5 microns of NaCl particle diameter).

One of ordinary skill in the art will recognize the need to balance particle penetration across a filter with the resistance to which the filter is subjected during filtration. In addition, it is also necessary to balance high initial alpha values with the alpha values after some degree of filtration challenge. The concentration of charge additives used according to the present invention as well as the identity of the charge additives can be varied to achieve optimal performance of electret filter media.

Filter efficiency and properties of the electret filter media of the invention can also be optimized through additional processing techniques. In one embodiment the polymer web, which has incorporated therein the charge stabilizing additive, can be heat treated after the web is charged or treated to form a permanent dipole. Heat treating the web at this stage of the manufacturing process can enhance the charge stability in the resulting filter media. Heat treatment can usually be conducted at temperatures in the range of about 65° C. to about 232° C., inclusive, preferably between about 121° C. to about 165° C., inclusive, for approximately 0.25 minutes to about 5 minutes, inclusive, more preferably for about 1.5 minutes to about 3 minutes. Such a post-charging heat treatment technique is particularly useful to enhance filter performance.

Preferably, heat treatment is applied to the electret filter after charging or formation of the permanent dipoles. Such heat treatment can result in a lower initial alpha, but the alpha values after a degree of filter loading tend to be higher than those achieved with filter materials that do not receive heat treatment. Heat treatment of the electret filter can be accomplished by methods known in the art, such as infrared heaters, microwave heaters, oil or water heated rollers, and convention ovens. Preferably, the step of heat treating, e.g., annealing, is performed by convection, thereby affording uniform annealing of the melt blown fiber web which contains the melt processable fatty acid amide within the web.

A variety of techniques are well known to impart a permanent dipole to the polymer web in order to form electret filter media. Charging can be effected through the use of AC and/or DC corona discharge units and combinations thereof. The particular characteristics of the discharge are determined by the shape of the electrodes, the polarity, the size of the gap, and the gas or gas mixture. In one embodiment charging can be accomplished solely through the use of an AC corona discharge unit. In another embodiment it is useful to use both AC and DC corona discharge units. In a preferred technique the polymer web is first subjected to AC corona discharge followed by one or more successive treatments by a DC corona discharge unit. Charging can also be accomplished using other techniques, including friction-based charging techniques. Typically the fiber web is subjected to a discharge of between about 1 to about 30 kV(energy type, e.g., DC discharge or AC discharge)/cm, inclusive, preferably between about 10 kV/cm and about 30 kV/cm, inclusive, with a preferred range of between about 10 to about 20 kV/cm, inclusive.

It will be appreciated by one of ordinary skill in the art that corona unit(s), AC corona discharge unit(s) and/or DC corona discharge unit(s) can be placed above and/or below a meltblown fiber web to impart electret properties to the fiber web. Configurations include placement of a neutrally grounded roll(s) on either side of the fiber web and the active electrode(s) above or below either side of the web. In certain embodiments, only one type of corona discharge unit, e.g., a DC or an AC corona discharge unit, is placed above, below or in an alternating arrangement above and below the fiber web. In other embodiments alternating AC or DC corona discharge units can be used in combination. The AC or DC corona discharge unit can be controlled so that only positive or negative ions are generated.

In one embodiment, a permanent dipole can be imparted to the polymer fiber web as follows. The web is first charged using an AC corona, followed by a charging with a series of DC corona discharge units, e.g., DC charge bars. The DC corona discharge units are positioned on alternating sides of the passing fiber web and each successive DC corona discharge unit applies a charge of a different polarity, i.e., positive/negative. In a preferred embodiment, the charge of the DC corona discharge units located above and below the nonwoven web alternates from positive to negative in a series of treatments, e.g., 2, 4, 6, etc. Alternatively, the DC corona discharge units are positive or negative and do not alternate in charge.

An example of a process for producing electret properties in fiber webs can be found in U.S. Pat. No. 5,401,446, the contents of which are incorporated herein by reference.

The present invention also provides methods to manufacture a composite filter media by melt blowing a first polymer resin having a charge stabilizing fatty acid amide incorporated therein onto a collecting belt. The belt typically has a "non-stick" surface and can be one of many known in the art. This step produces a first web of melt blown polymer fibers in which the charge stabilizing amide is present at a concentration from about 0.5% to about 11% by weight. The first melt blown web is treated to form therein substantially permanent charge pairs or dipoles, thus creating an electret.

A second melt web of polymer fibers from the polymer resin having a charge stabilizing fatty acid amide incorporated therein is melt blown onto the first melt blown electret layer. Again, the charge stabilizing amide is then present in the polymer resin at a concentration in the range of about 0.5% to 11% by weight. The second melt blown web is likewise treated to form therein substantially permanent charge pairs or dipoles, thus creating an electret.

Collectively, the first and second melt blown electret layers form a composite first component.

Separately, a third polymer resin having a charge stabilizing fatty acid amide incorporated therein is melt blown onto a non-stick collecting belt. This produces a third web of melt blown polymer fibers from the polymer resin, in which the charge stabilizing amide is present at a concentration from about 0.5% to about 11% by weight. The third melt blown web is treated to form therein substantially permanent charge pairs or dipoles, thus creating an electret.

Optionally, a fourth melt blown web of polymer fibers from the polymer resin having incorporated therein a charge stabilizing fatty acid amide is melt blown onto the third melt blown electret layer. Again, the charge stabilizing amide is present in the polymer resin at a concentration from about 0.5% to about 11% by weight. The fourth melt blown web is then treated to form therein substantially permanent charge pairs or dipoles, thus creating an electret.

The third and, optionally, the fourth and any subsequent melt blown electret layers collectively form a composite second component. Composite first and second components can then be joined by any suitable process, such as laminating. Optionally, a support layer(s) can be bonded to the outermost melt blown layers of the composite to provide additional strength.

One useful technique for processing the filter composite media of the invention is as follows. The filter composite media can be prepared by forming, such as in an extruder, a first web of melt blown polymer film from a polymer resin such as polypropylene. The resin includes, in concentrated form, a desired amount of the charge stabilizing additive, e.g., a fatty acid amide as described supra. The resulting web can be attenuated at a processing station, such as by drawing the fibers at a ratio of about 300:1. The first web is collected on a non-stick collecting belt or web. Thereafter, the first web is subjected to charge treatment (which can be a corona unit, an AC discharge unit, a DC corona discharge unit or combinations thereof) to form substantially permanent charge pairs or dipoles in the melt blown polymer web. In some instances it may be preferred to use an AC corona discharge unit followed by a DC corona discharge unit at a processing station. Alternatively, charging can be effected using an AC corona discharge unit followed by one or more successive treatments in a DC corona discharge unit. Charging can also be accomplished using other techniques, including friction-based techniques.

The process is then repeated, whereby a second web of melt blown polymer film, as described above is extruded onto the first web of melt blown polymer film. The first and second layers of melt blown polymer film are then subjected to charge treatment, forming the composite first component. Separately, a third web of melt blown polymer film is extruded onto a collecting belt and subjected to charge treatment as described above. Optionally, a fourth or more layers can be extruded onto the third web and the process repeated. Finally, the last-added melt blown electret fiber layers of the composite first and second components are contacted, e.g., laminated, to each other to form a composite. Optionally, an outermost support can also be bonded to one or both of the outermost layers of the composite, either at the end of the processing or at the start of processing. Subsequent to forming and charging the composite electret filter media, and as noted above, the media can be subjected to heat treatment to improve its charge retention properties. For example, heat treatment may take place at temperatures in the range of about 65° C. to 232° C., inclusive, for approximately 0.25 minutes to about 5 minutes, inclusive. An exemplary heat treatment protocol exposes the media to temperatures in the range of about 143° C. for 2.5 minutes. Heat treatment can be conducted individually for each melt blown layer, or the entire composite can be heat treated.

In another embodiment the charge stabilizing additive need not be included as a concentrate with the polymer resin. Instead, a liquid form of the additive or additive mixture can be sprayed onto the extruded fibers that form the polymer web.

The following examples serve to further described the invention.

EXAMPLES

In example provided below, a flow rate of 52 lpm and a test filter area of 100 cm$^2$ were used. The filtration media was placed within the instrument and closed for an instantaneous measurement.

A polypropylene fatty acid amide annealed electret fiber web was prepared by the following process. Approximately 99 pounds of polypropylene resin was melt blended with approximately 1 pound of ACRAWAX° C at a temperature of about 545° F. for approximately 4 minutes prior to extrusion into a spinnerette. The polymer/ACRAWAX melt blend was heated in an extruder to a temperature of about 545° F. in an extruder heated to about 545° F. The polymer melt blend was passed through a connecting hose to a melt pump and maintained at about 545° F. The polymer melt blend was then passed into a die body, e.g., a spinnerette, maintained at about 545° F. and fed through die tips, thereby forming fibers. The fibers are then cooled to a temperature of about 37° C.

The resultant fibers are sprayed onto a collecting belt on a rotating drum or belt, with suction, thereby forming a nonwoven web about approximately 72 inches wide having a fiber diameter of between about 3 µm and a web basis weight of about 35 g/m$^2$. The fibers were collected onto the collecting belt with suction at a line speed of about 74 feet per minute.

The nonwoven web was then immediately AC corona discharge treated. The apparatus was configured such that the nonwoven web is passed through a gap formed between an electrode and silicone sleeve portion of the corona unit. The gap width between the electrode and silicone sleeve of the corona unit was about 0.08 inches. The corona charge applied to the nonwoven web was about 5 kilowatts/cm. Treatment time with the corona charge were about 0.05 seconds.

The nonwoven corona treated web was immediately thereafter treated with DC corona discharge of about 30 kilovolts/cm at about 3 milliamperes for about 0.5 seconds. During the corona and DC discharge treatments, the temperature of the surrounding process area was maintained at or below 86° F. with the relative humidity of about 18%.

This process was repeated such that a second layer of melt blown fibers were extruded onto the first layer of melt blown fibers. Similarly, a third and subsequent pairs of melt blown fiber layer were treated as above. The melt blown electret fiber webs were laminated to each other by ultrasonic welding to form a final composite. An outermost support layer was attached to the outermost melt blown layer by ultrasonic welding.

The resulting five layer filter electret composite was prepared as described above, wherein the first layer was a support layer, TYPAR 3151 (approximately 55 g/m$^2$), and layers two through five were melt blown polypropylene fibers with 1.0% ACRAWAX (each layer approximately 35 g/m$^2$). Table 1 illustrates various properties of the material as well as the data achieved when the material was subjected to NaCl and DOP challenges.

TABLE 1

| Physical Property | Value |
| --- | --- |
| Basis Weight of 5-layered composite | 209.1 g/m$^2$ |
| Thickness of 5-layered composite | 74.1 mils |
| NaCl Resistance | 28.3 mm H$_2$O at 52 lpm |
| NaCl Penetration | 0.001% at 52 lpm (0.3–0.5 micron particle diameter) |
| DOP Resistance | 28.6 mm H$_2$O at 52 lpm |
| DOP Penetration | 0.005% at 52 lpm (0.26 micron diameter droplet size) |

TABLE 1-continued

| Physical Property | Value |
|---|---|
| Fiber Diameter of Meltblown layers | about 3 microns |
| Air permeability of Individual meltblown layers | about 47 cfm/ft$^2$ |

The efficiency of the filter composite was greater than 99.97%.

Those of ordinary skill in the art will know, or be able to ascertain, using no more than routine experimentation, many equivalents to the specific embodiments of the invention described herein. These and all other equivalents are intended to be encompassed by the following claims. All publications and references cited herein including those in the background section are expressly incorporated herein by reference in their entirety.

What is claimed is:

1. A filter media formed from a multicomponent sheet, the sheet comprising:
    at least two enmeshed layers of a melt blown electret polymer fiber web, each having a melt processable fatty acid amide present within the web at a concentration in the range of about 0.5% to 11% by weight.

2. The filter media of claim 1, further including an outermost supporting layer.

3. The filter media of claim 2, wherein the outermost supporting layer is polypropylene.

4. The filter media of claim 2, wherein the outermost supporting layer has a weight in the range of about 0.9 ounces/yd$_2$ to about 4.0 ounces/yd$_2$.

5. The filter media of claim 4, wherein the outermost supporting layer has a weight of about 1.6 ounces/yd$_2$.

6. The filter media of claim 1, wherein the sheet comprises two pairs of enmeshed melt blown electret polymer fiber webs having the melt processable fatty acid amide present within each of the melt blown electret polymer fiber web layers.

7. The filter media of claim 6, wherein the melt blown electret polymer fiber webs are polypropylene.

8. The filter media of claim 6, wherein the multicomponent sheet comprises two pairs of two enmeshed layers of the melt blown electret polymer fiber web, the two pairs being joined together.

9. The filter media of claim 1, wherein the fatty acid amide has a concentration of about 1% by weight.

10. The filter media of claim 1, wherein the fatty acid amide is selected from the group consisting of a stearamide, ethylene bis-stearamide, and mixtures thereof.

11. A vacuum bag, comprising:
    an outermost support layer; and
    a filter media in the form of a multicomponent sheet having
        a first spunbond layer contacted to the outermost support layer,
        at least two enmeshed layers of a melt blown electret polymer fiber web, each having a melt processable fatty acid amide present within the web, wherein the amide is present at a concentration in the range of about 0.5% to 11% by weight.

12. The vacuum bag of claim 11, wherein the outermost supporting layer is polypropylene.

13. The filter media of claim 17, wherein the multicomponent sheet comprises two pairs of two enmeshed layers of the melt blown electret polymer fiber web, the two pairs being joined together.

14. The filter media of claim 13, wherein the melt blown electret polymer fiber web is polypropylene.

15. The filter media of claim 13, wherein the weight of the fibers that form the melt blown web is in the range of 10 to 100 g/m$_2$.

16. The filter media of claim 13, wherein the average fiber diameter of the fibers that form each melt blown web is in the range of about 1 to 15 micrometers.

* * * * *